United States Patent [19]
Rodriguez et al.

[11] Patent Number: 5,402,146
[45] Date of Patent: Mar. 28, 1995

[54] SYSTEM AND METHOD FOR VIDEO COMPRESSION WITH ARTIFACT DISPERSION CONTROL

[75] Inventors: Arturo A. Rodriguez, Belmont, Calif.; Mark A. Pietras, Boynton Beach, Fla.; Andres J. Saenz, Belmont, Calif.

[73] Assignee: International Business Machines Corporation, Armonk, N.Y.

[21] Appl. No.: 965,579

[22] Filed: Oct. 23, 1992

[51] Int. Cl.6 .................... H04N 7/12; H04N 11/02
[52] U.S. Cl. ........................... 348/400; 348/384; 348/390; 348/405
[58] Field of Search .............. 358/133, 135, 136, 105; 348/404, 405, 407, 419, 398, 396, 384, 390, 400; H04N 7/12, 11/02

[56] References Cited

U.S. PATENT DOCUMENTS

| | | | |
|---|---|---|---|
| 4,442,454 | 4/1984 | Powell | 358/135 |
| 4,703,350 | 10/1987 | Hinman | 358/105 |
| 4,849,810 | 7/1989 | Ericsson | 358/135 |
| 5,103,306 | 4/1992 | Weiman et al. | 348/400 |
| 5,107,345 | 4/1992 | Lee | 358/136 |
| 5,150,209 | 9/1992 | Baker et al. | 358/133 |

*Primary Examiner*—Tommy P. Chin
*Assistant Examiner*—Vu Le
*Attorney, Agent, or Firm*—Bernard D. Bogdon

[57] ABSTRACT

Systems and methods that enable digital video compression techniques to manage and control artifact presence in each compressed frame of the video clip. Wherein specific embodiments are applicable to interframe and intraframe video compression methods and can be used in the compression of digital images and digital video clips. Other embodiments are employable in digital video compression and are applicable to interframe compression methods. A mechanism to increase the amount of video compression, while maintaining video quality that may otherwise be sacrificed with such increases in video compression, by threshold value management to accommodate the human eye's ability to more readily discern local image features or artifacts at central image locations or focused-upon areas, while tolerating, to a greater extent, artifacts dispersed elsewhere in the image.

6 Claims, 2 Drawing Sheets

SYSTEM AND METHOD FOR VIDEO COMPRESSION WITH ARTIFACT DISPERSION CONTROL

RELATED APPLICATIONS

The following application, concurrently filed, which is assigned to the same assignee of this application and is hereby incorporated herein by reference, is related:

(1) "HYBRID VIDEO COMPRESSION SYSTEM AND METHOD CAPABLE OF SOFTWARE-ONLY DECOMPRESSION IN SELECTED MULTIMEDIA SYSTEMS" (BC9-92-120), Ser. No. 07/965,580, concurrently filed by A. A. Rodriguez et al.

BACKGROUND OF THE INVENTION

Technical Field

The invention relates to the compression of digital video signals which are stored and played back in real-time on a digital computer, and more particularly this invention relates to a method of data compression that supports real-time recovery, decompression, reconstruction, and display of digitized video signals on a minimal personal computer system. Still more particularly, the invention relates to a method for compression of digital video that enables real-time video decompression and playback with a computational load readily carried by the central processing unit (CPU) of low-end personal computers (e.g. a computer based upon an Intel 80386SX processor running at 16 mhz) without hardware modification of the computer while maintaining satisfactory high level perceived video quality by controlling the dispersion of artifacts in each compressed frame of a video clip.

DESCRIPTION OF THE RELATED ART

A video signal comprises a sequence of frames, which when displayed at a given minimum frame rate (e.g., 15 to 30 frames per second in a personal computer) simulate the appearance of motion to a human observer. In a personal computer system, each frame of the video image comprises a matrix of picture elements or "pixels." A common image matrix may have 320 columns by 240 rows of pixels. A pixel is the minimum unit of the picture which may be assigned a luminance intensity, and in color video, a color. Depending upon the data format used, as many as three bytes of data can be used to define visual information for a pixel. A pixel by pixel color description of all pixels for an entire frame can require over two hundred thousand bytes of data. The spatial resolution of an image is increased as the number of pixels increases.

To display a video segment, if such full frames were replaced at a frame rate of 30 frames per second, a computer could be required to recover from storage and write to video memory as many as 27 million bytes of data each second. Few contemporary mass data storage devices have both the bandwidth required to pass such quantities of data or the storage capacity to hold more than a few minutes worth of digital video information directly stored. As used herein, bandwidth means the volume of data per unit of time which can be recovered from an auxiliary storage device. Data compression is used to accommodate auxiliary storage devices in the storage and recovery of video segments for playback in real time, and to reduce traffic on the system bus.

Data compression allows an image or video segment to be transmitted and stored in substantially fewer bytes of data than required for full frame reproduction. Data compression can be based on eliminating redundant information from frame to frame in a digitized video segment (interframe or temporal compression), or by eliminating redundant information from pixel to pixel in individual frames (intraframe or spatial compression). Video compression techniques that are "lossy" do not fully preserve all the information originally captured in a scene.

Frame differencing compression methods exploit the temporal redundancy that exists between digital video frames from the same scene recorded moments apart in time. This reduces the required data needed to encode each frame. Two successive frames from a sequence of digital motion video frames are compared region by region (or pixel by pixel). The comparison process determines whether two corresponding regions are the same or different. The size and location of each region and the nature of the comparison and the definition of "same" and "different" depends on the set of thresholds supplied during compression.

Before a temporal redundancy can exist, one frame represents a point in time before another following frame. If two regions being compared are the same, then the pixels in the regions from frame N do not need to be encoded and stored if the pixels in a frame N—1 are already known. When two regions are different, the pixels in the later frame must be encoded and stored. When each region of two frames have been compared, encoded and stored, the process moves to the next pair of frames. During playback, the decompression process adds the stored information for each frame to the current state of the display memory using a process that is the logical reverse of the encoding process.

Different lossy compression methods can be used to compress given video clips. In general, as the compression of the video data is increased (i.e, the less number of bytes are consumed per frame), the quality of the video suffers. Video data compression is most generally increased by increasing the values of the set of thresholds employed to make decisions within any of the lossy compression methods. The ability to control the locations within the frame where the video quality is degraded as compression is increased, is desirable to obtain a compromise between the obtained compression and video quality.

Threshold values are selected as a function of the tolerance acceptable when comparing differences between frames of a video segment or corresponding regions within consecutive frames or frames temporally spaced. The differences are usually measured as a function of luminance values.

SUMMARY OF INVENTION

Image data is compressed with lossy image compression methods by exploiting redundancy and visual irrelevance in the numerical image data as set forth in the hereinbefore mentioned related application (1). When the numerical image data is reconstructed during decompression, and the image data appears to retain the fidelity of the original uncompressed image/video, the set of threshold values employed during the compression process are stated to have provided good quality video. When threshold values reflect a greater tolerance between image difference comparisons, and these values are applied during compression of the video or image, the reconstructed video or image during subsequent decompression, will tend not to keep the fidelity of the original video or image. The local image features which, for example, may appear out-of-place in the viewed image or frame, in this latter instance, are typically called artifacts.

By being able to control the threshold values and their physical application throughout the data stream and within each frame or pixel array of the image/video during compression, this invention can control in which locations of the image/video, artifacts will most likely appear or be less discernable to the human eye. This invention disperses the artifacts, or is perceived to disperse the artifacts, to image locations where the human attention is least focused or less concentrated. Thus this invention has the ability to control the dispersion of artifacts as one wishes to obtain further compression to satisfy bandwidth requirements.

This invention discloses two systems and methods that enable digital video compression techniques to control artifact presence in each compressed frame of the video clip. The first embodiment is applicable to interframe and intraframe video compression methods and can be used in the compression of digital images and digital video clips. The second embodiment is employable in digital video compression and is applicable to interframe compression methods. This invention provides a mechanism to increase the amount of video compression while reducing the amount of video quality that is typically sacrificed with such increases in video compression.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF INVENTION

This invention discloses and describes the system and method to disperse artifacts throughout a digital video frame while it is being compressed. Data compression can be based on eliminating redundant information from frame to frame in a digitized video segment, on eliminating redundant information from pixel to pixel in one frame, or by exploiting superior human perception of luminance intensity detail over color detail. "Lossy" compression methods do not fully preserve all of the information originally captured from a scene. Several lossy methods for the compression of video data are known in the art.

Lossy video or image compression methods typically contain a set of parameters, called quantization factors or thresholds, which can be selected, adjusted, or made variable to control the amount of compression. For any compression method, as the parameters are changed to obtained better compression, the visual quality of the reconstructed compressed video at playback will degenerate. The obvious result is that the more compression attained by a compression method, the less quality that is retained, or equivalently, the more artifacts that are introduced throughout each frame.

Figure 1:
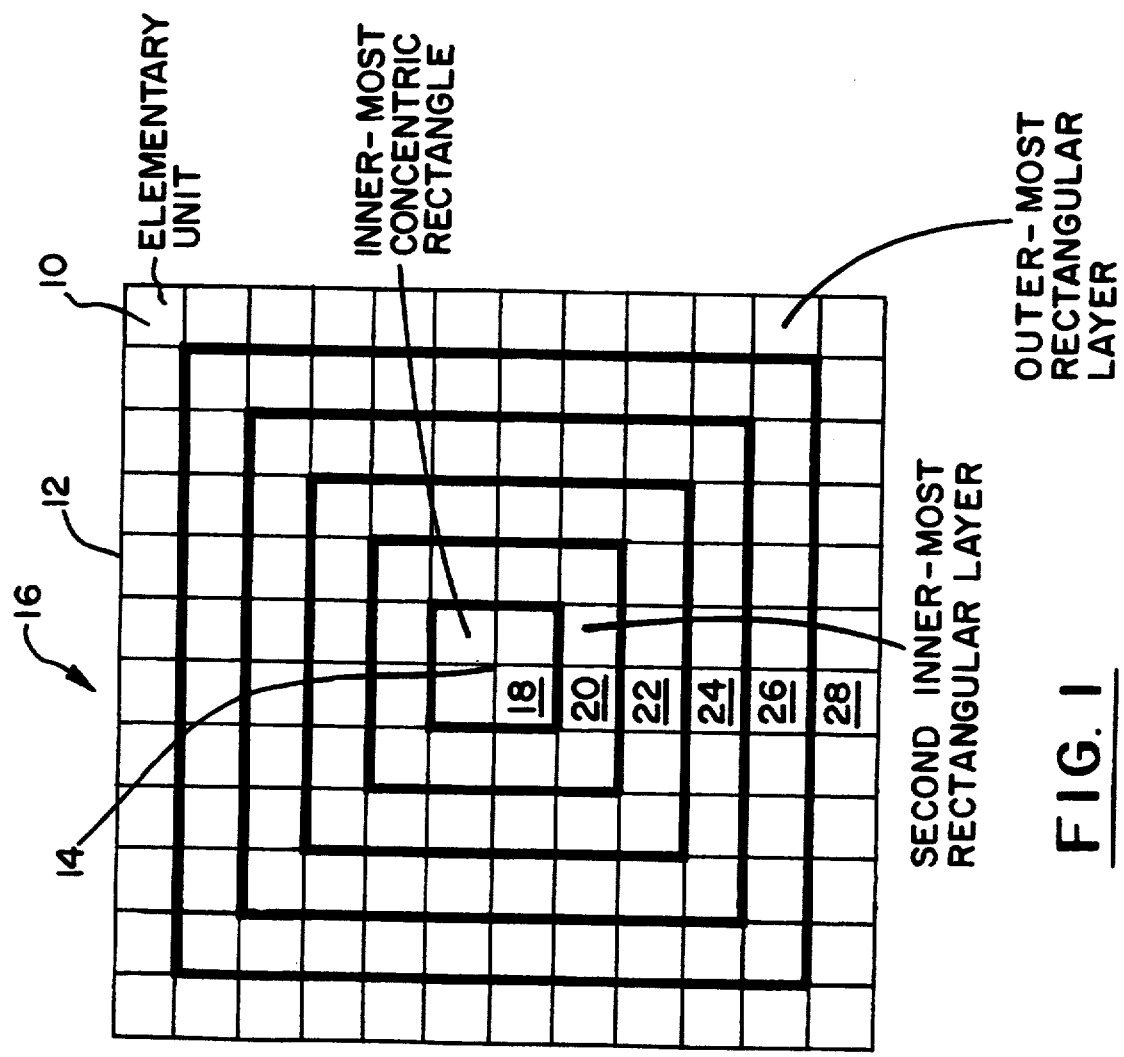
FIG. 1 is a variable threshold plane superimposed with an array of elementary units illustrating a unique thresholding technique for implementing an embodiment of the present invention.

As set forth in the referenced related U.S. patent application, (1) the Ultimotion TM compression method decomposes each frame into non-overlapping contiguous rectangular regions for the purpose of analyzing each region for its compression. Each rectangular region is called an elementary unit 10, as shown in FIG. 1. An elementary unit is composed of N number of pixels where N is an anteger. Since each elementary unit in a frame 12 is analyzed by the same set of procedures, the same set of thresholds could be applied to all of the elementary units. The frame 12 or $F_k$ is superimposed with an array of elementary units. This invention discloses two methods that apply variable thresholds throughout a frame while it is being compressed improving the perceived compression/decompression result.

Human beings, when viewing, tend to focus towards the center 14 of the video or image that they are perceiving. The retina of the human eye contains a higher concentration of rods and cones in its center to highly discriminate the information being focused upon. The density of these photoreceptors decreases as the distance away from the center of the retina increases. Accepting the premise that the vast majority of viewers visually focus toward the center of the video or image being viewed, it is a logical conclusion that artifacts are more or should be more tolerable towards the periphery of frames since the viewers will have less discernment in those regions.

Rather than exposing each elementary unit of a video frame or image to the same set of thresholds, this invention discloses the use of variable thresholds. In particular, settings of thresholds within concentric rectangles in the frame or image are disclosed.

As shown in FIG. 1, variable threshold plane 10 is used for each threshold, $T_i$, in the set of thresholds used by the compression method. Each variable threshold plane, $P(T_i)$, (e.g. plane 16) is demarcated with concentric rectangular shaped forms or layers 18, 20, 22, 24, 26 and 28, each with an imaginary spatial center coincident with the center 14 of the frame or image.

The inner-most rectangle 18 contains the lowest threshold value within the frame 12. Depending upon the intended result for image quality or compression criteria in some cases the central most areas will be assigned higher or the highest threshold value; layer in other cases, 20 may have the smallest threshold values. The second-most inner rectangular form or layer 20 is defined by the second most inner rectangle, within which layer 20 comprises the outermost peripheral area, minus the area of the inner most rectangle 18. Generally layer 20 contains a less restrictive threshold value within the frame or one which is more tolerant of artifacts. Alternatively layer 20 could be selected to have the same threshold value as the value used for the innermost rectangle 18.

The outer-most rectangular layer 28 generally contains the highest threshold value within the frame 12 and as a consequence will reveal artifacts more readily. In general, a rectangular layer has a greater or equal to threshold value than the adjacent, more inwardly disposed, rectangular layer. Therefore, the value of the threshold increases in level of restriction from the center 14 of the frame 12 to the periphery of the frame 12, which comprises the outer boundary of rectangular layer 28.

As illustrated for convenience, each layer 20, 22, 24, 26 and 28 is rectangular in shape and one elementary unit in depth. The depth of the layers does not need to be constant. With the above technique, a compression method required to compress a video clip or image to a specific number of bytes to satisfy bandwidth requirements, can increase the values of each variable threshold plane by a variable delta, with the greater delta values applied to layers towards the periphery of the image. Thus, compression is attained as a function of controlling the artifact dispersion such that they are less discernable and located towards the periphery of each frame.

Figure 2:
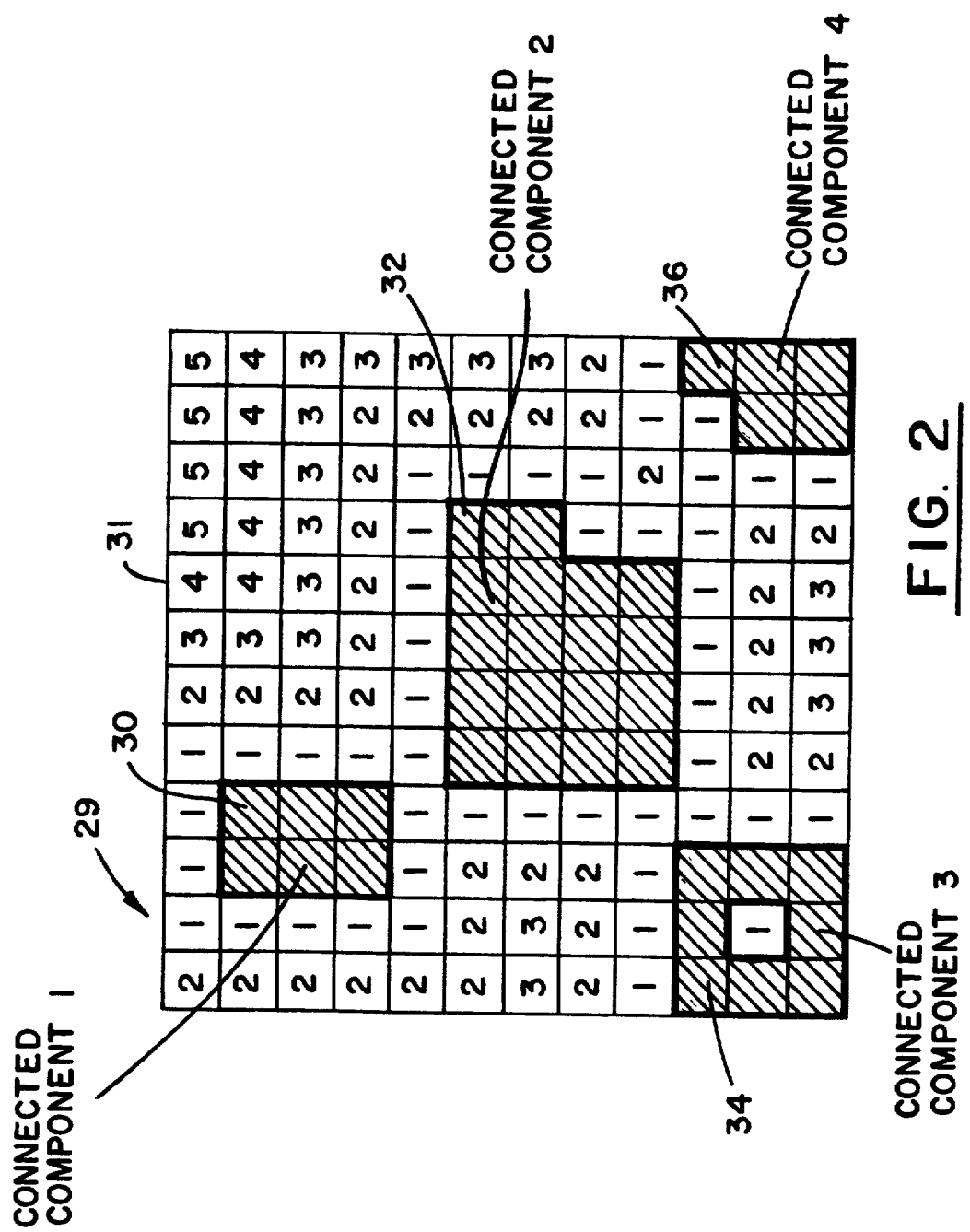
FIG. 2 is a variable threshold plane with illustrated frame-differencing regions depicting the thresholding techniques of an embodiment of the present invention.

A second feature of this invention is regarding the concept of regions of connected elementary units as illustrated in FIG. 2 by each connected component 1, 2, 3 and 4 further identified as connected regions 30, 32, 34, and 36, respectively, that differ when compared from frame to frame with a suitable frame-differencing algorithm such as the frame-differencing algorithm described by Rodriguez, Pietras, and Saenz in the before mentioned incorporated by reference related U.S. patent application (1).

The method for implementing this inventive process is as follows:

First a high constant threshold value, $D_o$, is used throughout the variable threshold plane 29 of frame 31 or $F_k$ initially to detect elementary units that differed significantly between a preceding frame in the video segment and $F_k$. Threshold $D_o$ is used to detect frame-to-frame differences, and the representation of frame $F_k$. Elementary units that differed from frame $F_{k-1}$ to frame $F_k$ have been detected; are illustrated in FIG. 2 by cross hatched elementary units identified in the connected regions 30, 32, 34 and 36.

Connected regions (e.g., regions 30, 32, 34 and 36) of those elementary units that differed significantly are then detected. A connected component labelling algorithm, as described by A. Rosenfeld and A. C. Kak in Chapter 11 of the textbook: Digital Picture Processing Second Edition, Volume 2 by Academic Press, can be employed to detect the components of connected elementary units that differed in the array of elementary units.

For each detected connected region of elementary units that differed, concentric layers of contours, surrounding the contour of each connected region, are then mapped on the variable threshold planes (e.g. plane 29). To assign threshold values, the mapping of concentric layers of contours to the variable threshold planes must be performed carefully to avoid interference between multiple connected components of elementary units that differed.

Therefore, threshold value assignment is done iteratively as follows:
A. In the first iteration:
1) the variable threshold plane 29 is updated in the elementary unit locations corresponding to the first layer surrounding the connected components, which first layer is identified by elementary units 10 which are marked with the number "1";
2) The threshold value assigned, $D_1$, is significantly less than $D_o$ (e.g. $D_1 = 0.5\ D_o$). For elementary units labelled "1", assign a threshold $D_1$ in the variable threshold plane 29, where $(D_1 << D_o)$.
3) The processed contours in this iteration are then considered the contour of their respective connected component in the next iteration. As can be appreciated from the stated value relationship of thresholds $D_1$ and $D_0$, the visual quality of the elementary units labeled "1" is improved, enhancing the boundary between the component and the background to better contrast the component.

B. In the succeeding iterations:
1) the variable threshold plane 29 is updated in the elementary unit locations corresponding to the next layer of elementary units labelled "2" surrounding the connected components, only if that elementary unit location has not been assigned a threshold value previously. For elementary units labelled "2", assign a threshold $D_2$ in the variable threshold plane 29 where $(D_2 \geq D_1)$.
2) The threshold value $D_i$ is increased towards the outer layers of the frame at elementary units labelled "3", "4" and "5".
   For elementary units labelled "3", assign a threshold $D_3$, in the variable threshold plane 29 where $(D_3 \geq D_2)$. Likewise for elementary units labelled "4", assign a threshold $D_4$, where $(D_4 \geq D_3)$ and for elementary units labelled "5", assign a threshold $D_5$, where $(D_5 \geq D_4)$.
3) The processed contours in a present iteration are then considered the contour of their respective connected component in the next iteration.

This method is an exemplary for providing artifact control according to the principles of the present invention. Dispersing the artifacts away from the center of image regions or objects that differ from frame to frame. Humans tend to direct their attention to sections of the video or image where larger regions change. Therefore, this invention exploits how a human focuses when viewing displayed video and thereby controls the dispersion of artifacts.

While the invention has been particularly shown and described with reference to a preferred embodiment, it will be understood by those skilled in the art that various changes in form and detail may be made therein without departing from the spirit and scope of the invention.

What is claimed is:

1. A method of managing artifact dispersion in a compressed representation of an image or video segment, the method comprising the steps performed by a computer system of:
   recording the image or video segment as a sequence of frames, each of said frames comprising a plurality of pixels organized in an array of pixel locations;
   decomposing each of said frames into an array of non-overlapping contiguous rectangular regions for measuring properties in each of said rectangular regions;
   detecting at least one connected component having an area within the rectangular regions within one of said frames which said connected component of the rectangular regions differs from an area within a previous frame corresponding to the area of said at least one connected component when subjected to a frame differencing algorithm having a given threshold value $T_R$;
   mapping all said rectangular regions immediately surrounding and contiguous with said at least one connected component of rectangular regions to define a first concentric layer of contour within said one of said frames;

mapping a second concentric layer of contour within said one of said frames, wherein said second concentric layer comprises rectangular regions surrounding and contiguous with said first concentric layer of contour;

selecting, through an iterative sequence, threshold values for each of said first and second contour layers wherein a threshold value $T_1$ for the first concentric contour layer is equal to or different than the threshold value $T_R$, and the second contour layer has a threshold value $T_2$ which is equal to or different than the threshold value $T_1$ for the first contour layer; and applying compression protocol as a function of the variable threshold values of each region of connected rectangular regions and each contour layer wherein the artifact display in each frame reconstructed from said compressed representation of said image or video segment comprising each region and contour layer exhibits managed artifact dispersion.

2. The method as specified by claim 1, further comprising a step of determining luminance image parameters for measuring the properties in each of said rectangular regions.

3. The method as specified by claim 1, further comprising a step of determining color image parameters for measuring the properties in each of said rectangular regions.

4. The method as defined in claim 1, further including a step of mapping all non-overlapping continuous rectangular regions in excess of said rectangular regions which comprise said first and said second concentric layers of contour to define additional concentric layers of contour within said one of said frames and a step of selecting through said iterative sequence, threshold values for each of said additional concentric layers of contour.

5. The method as defined in claim 4, wherein the step of mapping all non-overlapping contiguous rectangular regions in excess of said rectangular regions which comprise said first and said second concentric layers of contour, defines said additional concentric layers of contour to surround said at least one connected component and to be contiguous with at least one concentric layer which is contiguous with said connected component or with a concentric layer which is contiguous with said connected component or a concentric layer which is contiguous with the connected component directly or through another concentric layer.

6. The method as defined in claim 5, further comprising a step of selecting threshold values for each of said additional concentric layers of contour providing a threshold value of greater value for any of said additional concentric layers of contour which is more distant from said at least one connected component of rectangular regions than a threshold value for any of said additional concentric layers of contour, corresponding to said at least one connected component of rectangular regions, which is closer to said at least one connected component of rectangular regions.

* * * * *